Figures 1, 2:
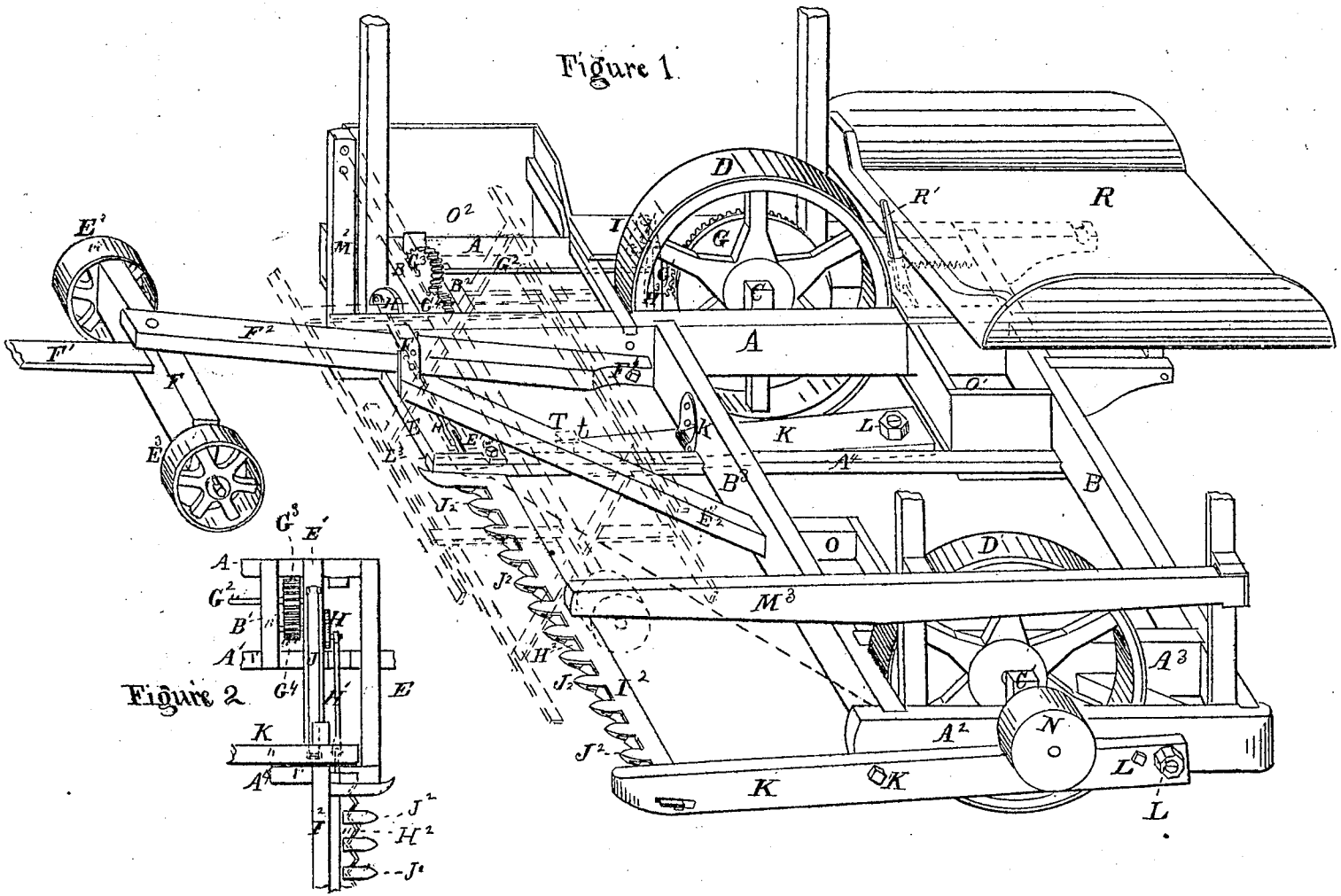

Sylla and Adams,
Mower.

No. 721 Reissued May. 17 1859

Sheet 2. 2 Sheets
Sylla and Adams Mower.
No 721
Reissued May 17, 1859
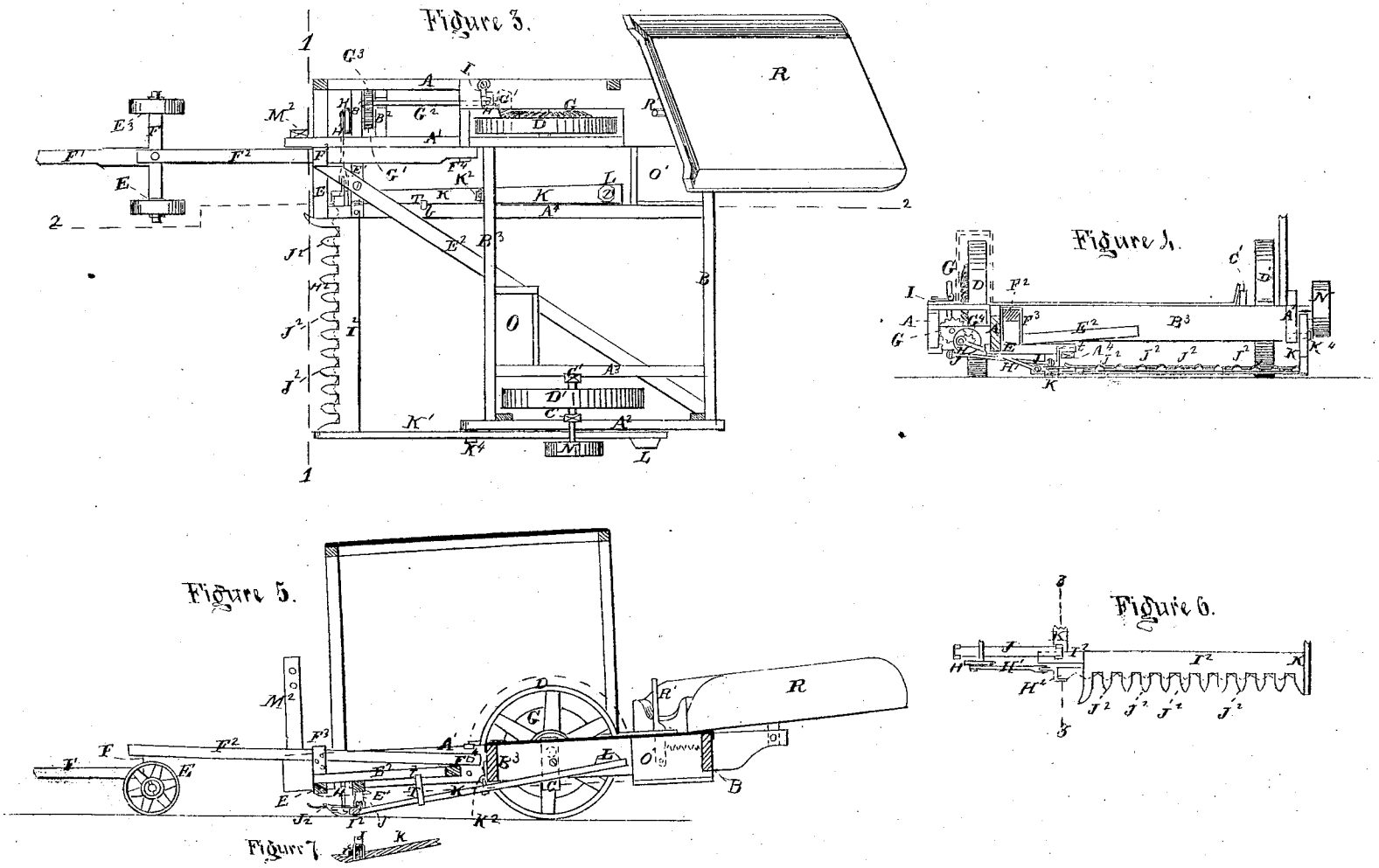

UNITED STATES PATENT OFFICE.

PHILO SYLLA, OF ELGIN, AND AUGUSTUS ADAMS, OF SANDWICH, ILLINOIS, ASSIGNORS TO C. AULTMAN & CO., OF CANTON, OHIO.

IMPROVEMENT IN GRAIN AND GRASS HARVESTERS.

Specification forming part of Letters Patent No. 10,038, dated September 20, 1853; Reissue No. 721, dated May 17, 1859.

DIVISION A.

*To all whom it may concern:*

Be it known that PHILO SYLLA, of Elgin, in the county of Kane and State of Illinois, and AUGUSTUS ADAMS, formerly of the same place, but now residing at Sandwich, in the county of DeKalb, in said State, invented certain new and useful Improvements in Machines for Harvesting Grain, Mowing Grass, &c., of which the following is a full, clear, and exact description, reference being had to the annexed drawings, which make part of this specification, and in which—

Figure 1 is a view in perspective of a machine showing one mode of applying said improvements, the finger-beam being raised from the ground to adapt the machine for reaping. Fig. 2 represents a plan of a portion of the under side of the machine, to exhibit more fully the flexible connection of the finger-beam with the main frame. Fig. 3 represents a plan of the machine, the finger-beam resting on the ground to adapt the machine for mowing. Fig. 4 represents a vertical transverse section of the machine at the line 1 1 of Fig. 3. Fig. 5 represents a vertical longitudinal section of the same at the line 2 2 of Fig. 3; and Fig. 6 represents a plan of the cutting apparatus, the finger-beam, and the coupling-arm for connecting the finger-beam to the main frame. Fig. 7 is a vertical section at the line 3 3 of Fig. 6, showing the provision for allowing play in the joint between the finger-beam $I^2$ and the yielding bar K.

That side of the machine which runs next the standing grain we call the "left" side, and the other, at which the horses are placed, we call the "right" side.

The accompanying drawings represent a machine having a frame large enough to support, in addition to the cutting apparatus and machinery required for mowing, a removable platform placed behind the cutter, (such as is common in ordinary machines adapted to reaping and mowing,) an elevated table behind the platform to bind the grain upon, stands for a raker and binders, a dumping-tray to carry the sheaves until a sufficient quantity for a shock has accumulated and then to dump them in a heap upon the ground, and a stand or place for the driver of the team by which the machine is drawn.

Whenever it may be expedient to use one or more of the several parts or branches of said improvements separate from the rest, such part or parts might be used in connection with frames and gearing more convenient than those herein described, which are proportioned and arranged with reference to the use of the whole of the parts together; and it is obvious that several parts of the said improvements are applicable to various other reaping and mowing machines in use. One mode of applying each of these improvements to practical use is shown in this machine. It is therefore unnecessary to specify the manner of applying the parts, respectively, to other machines, as the ordinary skill of a constructer is sufficient for that purpose.

In ordinary reaping-machines the raking of the grain from the platform and delivering it upon the ground in gavels is severe and irksome labor, which few men have the strength and stamina to perform during a whole day in a heavy crop of grain. The binding of the grain after the machine is likewise a very laborious task, especially when the gavels are discharged at the rear of the platform in the swath in which the machine is cutting, as they must be bound and removed before the machine can pass to cut the next swath. After the sheaves are bound in the ordinary way upon the ground they must be collected into heaps of a dozen or more, and each heap built into a shock designed to stand in the field until the grain, by exposure to the air, has been sufficiently dried or cured for packing away in large masses in a barn or in a stack. The collecting of the sheaves into heaps at the points where shocks are to be made involves a great deal of traveling through the stubble and much hard labor.

To make it practicable to rake the grain into gavels, bind the gavels into sheaves, and collect the sheaves into heaps suitable for shocks with less manual labor than has heretofore been requisite for the performance of these operations, by transferring the labor in part from the men to the horses, in part performing it automatically, and by mechanical aids facilitating the performance of the remainder, are the objects sought to be attained by the improvements herein claimed, which consist—

First. In combining with the platform for receiving the grain as it is cut an elevated table for receiving the gavels, which, when raked off the platform at intervals, are deposited on this table in front of the binders, who ride upon the machine while binding, instead of walking upon the ground.

Second. In combining with the binding-table one or more stands for the binders, depressed below the level of the table, so that the binder may have the grain to be bound laid before him above the level of his feet, to relieve him from the necessity of stooping so low as he has to do in binding in the ordinary way upon the ground.

Third. In combining with the stand and table for the binders an elevated side, against which he may rest his legs and thus steady himself, leaving his arms free to do the binding, whether the binding-table be elevated or not. This is of great importance, as the jolting of the machine without a lateral support for his legs would often disturb the equilibrium of the binder and render it necessary for him to resort to the aid of his arms to steady himself, which of course would interfere with and impede his working.

Fourth. In combining the stand for the raker with the stands for the binders in such relative positions that the raker can conveniently lay the gavels of grain before the binders in succession.

Fifth. In combining with the stands for the raker and binders a dumping-tray—*i. e.*, a shallow tray large enough to hold as many sheaves (thrown upon it one at a time, as they are bound in promiscuous order) as it may be deemed advisable to put into one shock—which tray is so arranged that it can stand in the proper position to be loaded with sheaves, and then have its bottom moved far enough to dump or discharge its load in a heap on the ground, the location of the tray relative to the binders' stands being such that the bound sheaves can be conveniently deposited therein by the binders, and the binders' stands being so placed relatively to the raker's stand that the raker can conveniently deposit the unbound grain before them.

In the accompanying drawings, the main frame A $A'$ $A^2$ $A^3$ $A^4$ B $B'$ $B^2$ $B^3$ E $E'$ $E^2$ is supported upon two wheels, D and $D'$, whose journals rest in bearings in blocks C $C'$, made adjustable to set the frame at a variable distance from the ground. This frame is heavier in front of than behind the axis of the wheels D $D'$, and the preponderating weight is sustained by a truck in front, composed of two wheels, $E^3$ $E^3$, and an axle, F, and connected with the main frame by a draft-bar, $F^2$, hinged at its rear end on a pivot, $F^4$, to the beam $A'$ of the frame. For the purpose of allowing the front of the main frame to be raised, lowered, and held at different heights, the draft-bar passes through a strap, $F^3$, attached to the beams E and $A'$, and a wedge placed between the top of the strap and the draft-bar holds the front of the frame at any required height within the range of adjustment allowed by the strap, and it may be lowered by withdrawing the wedge, and may be held down by placing the wedge between the under side of the draft-bar and the bottom of the strap. A like effect may be produced by passing a pin through the strap above or below the draft-bar in the holes made for the pin in the sides of the strap. By these means the connection of the draft-bar with the frame may by turns be limber or rigid and the front of the frame set at various heights from the ground. When the wedge and pin are withdrawn the front of the main frame and the front end of the tongue respectively are free to play up and down within the limits of the strap independently of each other. The ends attained by the adjustment already described may likewise be attained to a certain extent by adjusting the pivot $F^4$, on which the rear end of the draft-bar $F^2$ hinges from one hole to another in a series formed for its reception in the side of the beam $A'$.

The tongue $F'$, by which the horses draw the machine, is attached to and extends forward from the axle of the truck.

The motion of the cutter in this machine is derived from one of the wheels which carry the main frame. On the side of the right wheel D a bevel-wheel, G, is secured, which takes into and drives a pinion, $G'$, on a counter-shaft, $G^2$, which also carries a spur-wheel, $G^3$, that takes into and drives a pinion, $G^4$, on the end of a shaft whose opposite end carries a crank, H, which, through a connecting-rod, $H'$, jointed to the cutter-bar $H^2$, communicates a vibratory motion to a cutter arranged to play through a series of guard-fingers, $J^2$, projecting from the front side of the finger-beam $I^2$. The bearing of that end of the shaft $G^2$ which carries a pinion, G, is in an upright arm, $H^3$, hinged at its lower end to the frame, so that by turning this arm toward or from the wheel D the pinion may be thrown into or out of gear with the wheel to put the cutter into or out of motion. The pinion is held in either position at will by means of a notched detent, I, pivoted to the main frame.

The cutter $H^2$ and guard-fingers $J^2$ are of the usual construction, and supported by the finger-beam in the usual manner. The finger-beam $I^2$ is made only of sufficient length to protect the cutter, and its right end is connected to the frame by means of a strong link or coupling-arm, J, hinged at its left end to the right end of the finger-beam and at its right end to a cross-beam, $E'$, of the main frame.

The progressive motion of the frame on its wheels carries forward the coupling-arm, and that in its turn carries forward the finger-beam and cutter, and as the coupling-arm is rigid laterally only and its left end (to which the

United States Patent Office

PTO - BOYERS, PA Duty Station

MISSING PAGE TEMPORARY NOTICE

PATENT # RE721 FOR ISSUE DATE 5-17-1859

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE p. 3 of text + rest.

PO/PA at Boyers 11-3-92

Data Conversion Operation

Boyers, Pa